US012486932B1

(12) United States Patent
Tseng et al.

(10) Patent No.: US 12,486,932 B1
(45) Date of Patent: Dec. 2, 2025

(54) FLOATING JOINT AND RETAINER CONNECTION DEVICE WITH PRESSURE RELIEF STRUCTURE

(71) Applicant: FOSITEK CORPORATION, New Taipei (TW)

(72) Inventors: Yung-Chih Tseng, New Taipei (TW); Hao-Yun Lee, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 18/797,931

(22) Filed: Aug. 8, 2024

(30) Foreign Application Priority Data

Jul. 29, 2024 (TW) ................................. 113128162

(51) Int. Cl.
*F16L 27/12* (2006.01)
*H05K 7/20* (2006.01)

(52) U.S. Cl.
CPC .......... *F16L 27/12* (2013.01); *H05K 7/20272* (2013.01)

(58) Field of Classification Search
CPC ....... F16L 27/00; F16L 27/08; F16L 27/0824; F16L 27/10; F16L 27/1008; F16L 27/1021; F16L 27/12; F16L 27/125; F16L 33/225; F16L 39/04; F16L 41/005; F16L 41/007; F16L 49/08
See application file for complete search history.

(56) References Cited

U.S. PATENT DOCUMENTS

| 1,489,277 | A | * | 4/1924 | Rains | ...................... | F16L 39/04 |
| | | | | | | 285/94 |
| 2,175,752 | A | * | 10/1939 | Gray | ....................... | F16L 27/00 |
| | | | | | | 285/94 |
| 3,446,245 | A | * | 5/1969 | Snyder, Jr. | .......... | F16L 27/0824 |
| | | | | | | 285/276 |
| 4,254,972 | A | * | 3/1981 | Wiedenbeck | ........... | F16L 39/04 |
| | | | | | | 285/422 |

(Continued)

FOREIGN PATENT DOCUMENTS

| EP | 1632705 | A1 | * | 3/2006 | .......... | F16L 27/0824 |
| GB | 2297000 | A | * | 7/1996 | .............. | F16L 27/08 |

(Continued)

*Primary Examiner* — Matthew Troutman
*Assistant Examiner* — Fannie Kee
(74) *Attorney, Agent, or Firm* — Demian K. Jackson; Jackson IPG PLLC

(57) ABSTRACT

A floating joint and retainer connection device includes a hollow fixed retainer having a through hole; an adaptor joint including a buffering section located between an engaging section and a fitting section and having an axially limiting section formed thereon, and the fitting section projecting from the fixed retainer via the through hole; a fixing element fitted on the fitting section to limit the adaptor joint from moving axially; an elastic element located between the fixed retainer and the fixing element; an abutting spacer located in the fixed retainer and fitted around the buffering section with an axially protruded section extending into the through hole to abut against the elastic element; and a spring pressing against the abutting spacer and the axially limiting section to compress the elastic element axially and provide a desired normal force for the adaptor joint to stay at any radial position in the through hole.

4 Claims, 4 Drawing Sheets

(56) References Cited

U.S. PATENT DOCUMENTS

| | | | | |
|---|---|---|---|---|
| 2010/0132178 A1* | 6/2010 | Chiu | ................... | F16L 27/12 |
| | | | | 29/281.5 |
| 2010/0232908 A1* | 9/2010 | Chiu | ................... | F16L 27/12 |
| | | | | 411/554 |
| 2012/0099943 A1* | 4/2012 | Chiu | ................... | F16L 27/12 |
| | | | | 411/347 |
| 2012/0195711 A1* | 8/2012 | Chiu | ................... | F16L 27/12 |
| | | | | 411/103 |
| 2013/0170895 A1* | 7/2013 | Tseng | ................... | F16L 27/12 |
| | | | | 403/270 |
| 2013/0294863 A1* | 11/2013 | Tseng | ................... | F16L 27/12 |
| | | | | 411/175 |
| 2014/0105707 A1* | 4/2014 | Tseng | ................... | F16L 27/12 |
| | | | | 411/508 |
| 2015/0071730 A1* | 3/2015 | Tseng | ................... | F16L 27/12 |
| | | | | 411/318 |
| 2015/0362102 A1* | 12/2015 | Pearl | ................... | F16L 27/12 |
| | | | | 285/390 |
| 2023/0143344 A1* | 5/2023 | Marquis | ............... | F16L 27/12 |
| | | | | 285/261 |
| 2024/0077160 A1* | 3/2024 | Zhang | ................... | F16L 39/04 |

FOREIGN PATENT DOCUMENTS

| | | | | |
|---|---|---|---|---|
| KR | 200325938 Y1 * | 9/2003 | ............. | F16L 27/08 |
| TW | I866775 B * | 12/2024 | ............. | F16L 27/12 |
| WO | WO-0136857 A2 * | 5/2001 | ............ | F16L 27/125 |

\* cited by examiner

FLOATING JOINT AND RETAINER CONNECTION DEVICE WITH PRESSURE RELIEF STRUCTURE

This application claims the priority benefit of Taiwan patent application number 113128162 filed on Jul. 29, 2024, the disclosure of which is hereby incorporated by reference in its entirety.

FIELD OF THE INVENTION

The present invention relates to a floating joint and retainer connection device, and more particularly to a floating joint and retainer connection device with pressure relief structure capable of reducing a resistance between an adaptor joint and a fixed retainer when the adaptor joint is slid radially relative to the fixed retainer.

BACKGROUND OF THE INVENTION

The existing server has highly increased computing performance, but the computing unit therein also produces more heat. Since there is a plurality of servers mounted in one server cabinet and the servers are closely arranged in the server cabinet with a relatively small space left between them, it is impossible to provide an additional thermal module for each of the servers to dissipate the heat produced by them. Therefore, there are manufacturers who try to remove the heat from the servers in the server cabinet by water cooling. In consideration of the precision electronic parts in the servers, it is necessary to prevent all pipe joints in the water cooling system from leaking, so as to protect the electronic parts from damages caused by water leaking.

For this purpose, most of the pipes for the water cooling system for the servers are made of hard or metal materials. A male and a female quick coupler are correspondingly provided on the server (i.e. a movable side) and the server cabinet (i.e. a fixed side) to enable quick connection of the server to the server cabinet end to end, such that water pipes provided on the movable side and the fixed side can be quickly connected or disconnected. Usually, a small radial tolerance would exist between the male and the female coupler to be connected to each other, and it is necessary to correct the radial tolerance quickly. For this purpose, at least one guide stem is provided on the fixed side (i.e. the server cabinet) near a position having the female coupler mounted thereto and a guide block internally defining a guiding bore is provided on the movable side (i.e. the server) near a position having the male coupler mounted thereto in correspondence with the guide stem. To assemble the male and the female coupler to each other, first insert the guide stem into the guiding bore in the guide block. Through guiding of the guide stem and the guide block, the two quick couplers initially having a radial tolerance between them are guided to an almost concentric position, so that the two quick couplers can be serially connected end to end.

There are other manufacturers who omit the guide stem and the guide block to save the space in the server cabinet. For this purpose, a fixed retainer and an adaptor joint for correcting the radial offset are provided on the female coupler and the male coupler, respectively, and a beveled surface is provided in the guiding bore of the female coupler at a position that contacts with the adaptor joint first when the female coupler is connected to the male coupler end to end. When connecting the female and the male coupler, the adaptor joint can be displaced radially relative to the fixed retainer to correct the radial offset of the male coupler from the female coupler. And, two washers are used to clamp the adaptor joint to the fixed retainer by applying a normal force to the adaptor joint and the fixed retainer, so that the adaptor joint can stay at a fixed position after it is displaced radially relative to the fixed retainer. However, when the normal force applied by the two washers to the fixed retainer is too large, the adaptor joint will be stopped by a large resistance from displacing smoothly. On the other hand, when the normal force applied by the two washers is too small, the adaptor joint would not be able to stay at a desired final position after it is displaced radially. It is therefore an important goal of the manufacturers of this field to overcome the above-mentioned problems.

SUMMARY OF THE INVENTION

A primary object of the present invention is to effectively solve the problems in the conventional way of aligning and connecting a male and a female with one another by providing a floating joint and retainer connection device with pressure relief structure, with which it is able to control a normal force for an adaptor joint to displace relative to a fixed retainer and to reduce a resistance between the adaptor joint and the fixed retainer, so as to control and keep the adaptor joint at a desired location after it is displaced radially relative to the fixed retainer, and further, the size of the radial slide resistance is selectable and it is controllable to set the adaptor joint at a slightly inclined angular position.

To achieve the above and other objects, the floating joint and retainer connection device with pressure relief structure of the present invention includes a fixed retainer, an adaptor joint, an elastic element, a fixing element, an abutting spacer, and a spring.

The fixed retainer has a first side and a second side, and internally defines a receiving space located between the first and the second side; and the first side is an open side and the second side is a closed side provided with a through hole communicable with the receiving space.

The adaptor joint has an engaging section and a fitting section, and includes a buffering section located between and connected to the engaging section and the fitting section; the adaptor joint has an axially limiting section formed at a junction of the engaging section and the buffering section; and the fitting section is extended through the receiving space to project from the fixed retainer via the through hole.

The elastic element is fitted on around the fitting section of the adaptor joint and has a front end and a rear end, and the rear end of the elastic element is pressed against the second side of the fixed retainer.

The fixing element is fitted on around the fitting section of the adaptor joint to press against the front end of the fixing element, so as to limit the adaptor joint from moving axially relative to the fixed retainer.

The abutting spacer is located in the fixed retainer and fitted around the buffering section of the adaptor joint; and the abutting spacer includes an axially protruded section formed on one side thereof for extending through the through hole to abut against the elastic element.

The spring is fitted around the buffering section with two ends of the spring pressed against another side of the abutting spacer and the axially limiting section of the adaptor joint.

In the floating joint and retainer connection device with pressure relief structure of the present invention, the spring can be effectively controlled to provide stable and desired normal force for the adaptor joint to slide radially relative to the fixed retainer to avoid a too large sliding resistance or a too small normal force between the adaptor joint and the fixed retainer when they slide radially relative to each other, so that the adaptor joint can stay or suspend at any desired position after it is displaced radially.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

Figure 1:
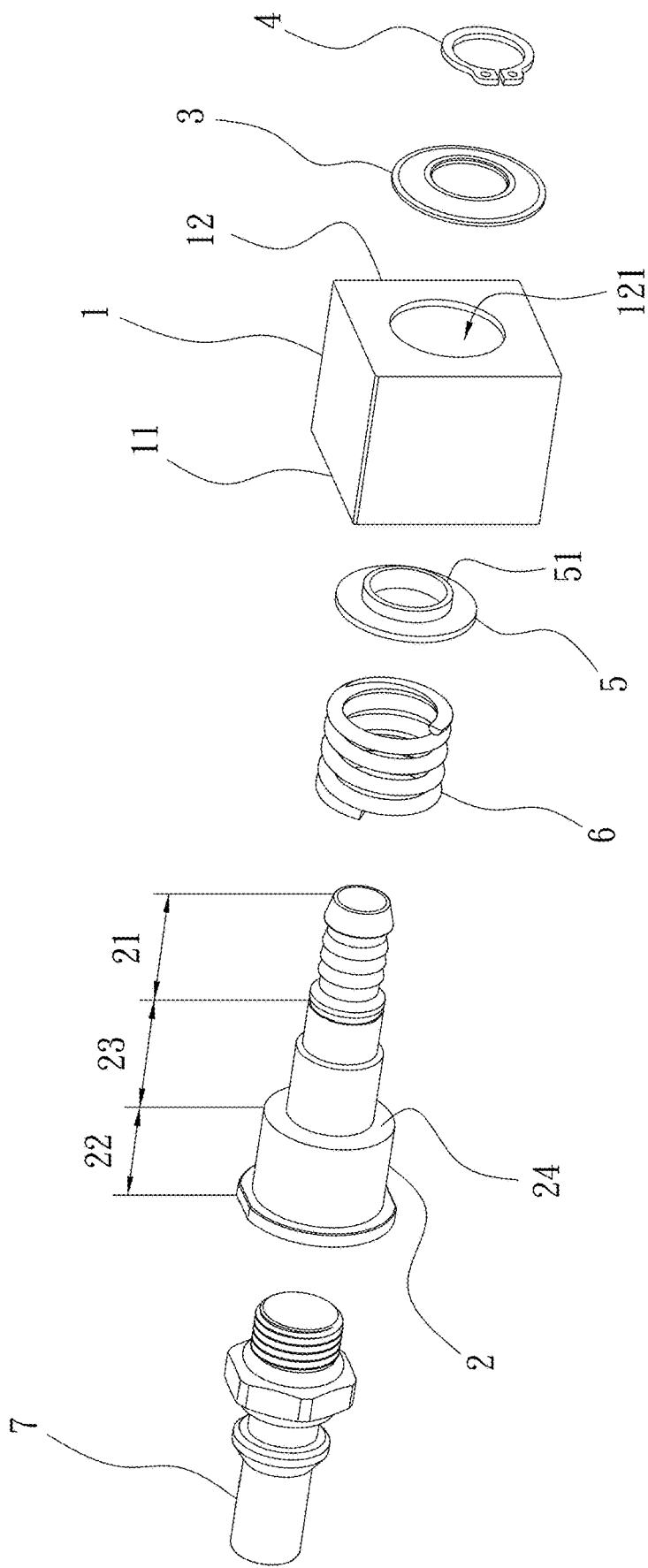
FIG. 1 is an exploded perspective view of a floating joint and retainer connection device with pressure relief structure according to a preferred embodiment of the present invention.
Figure 2:
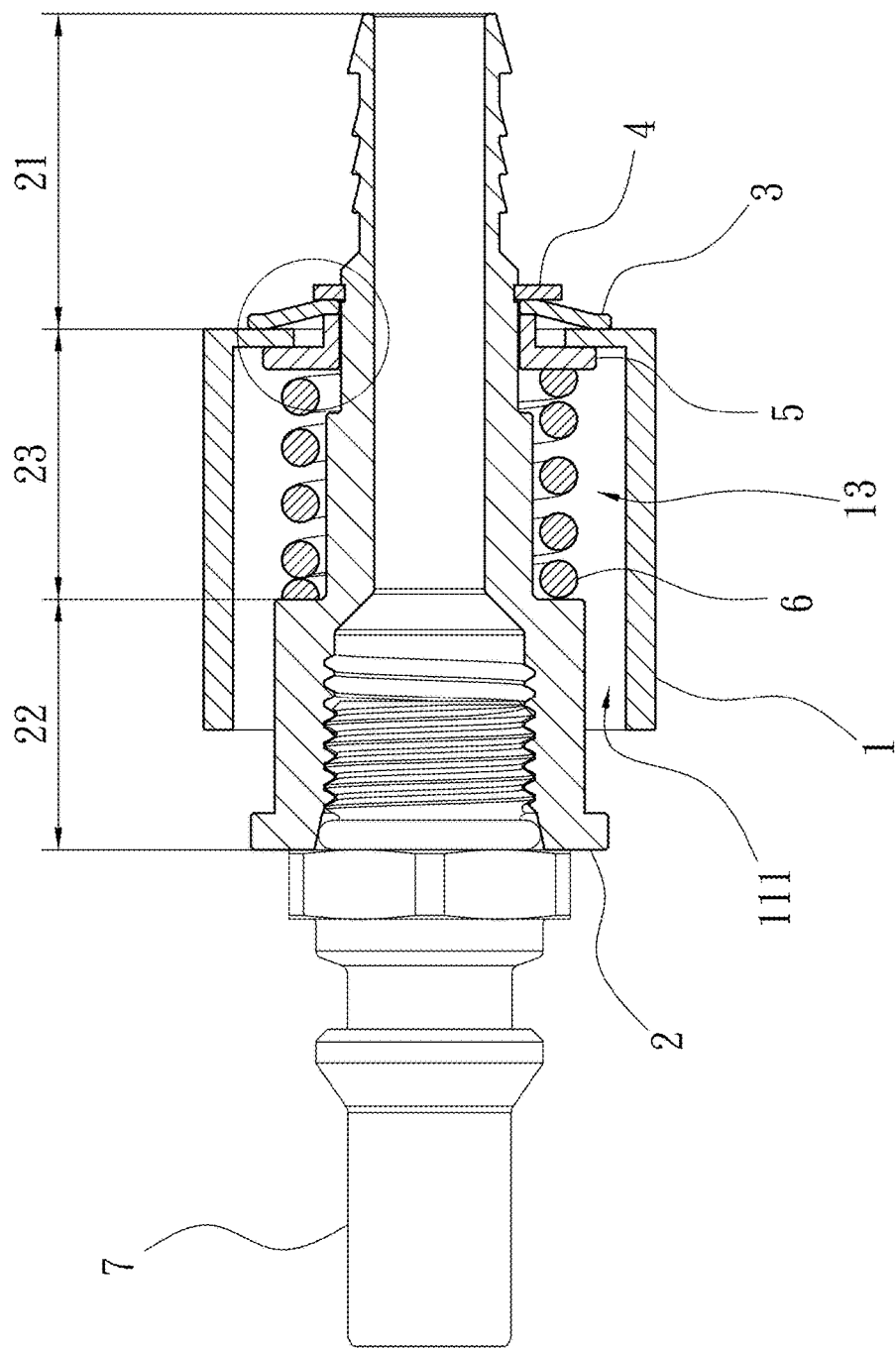
FIG. 2 is an assembled sectional view of FIG. 1.
Figure 3:
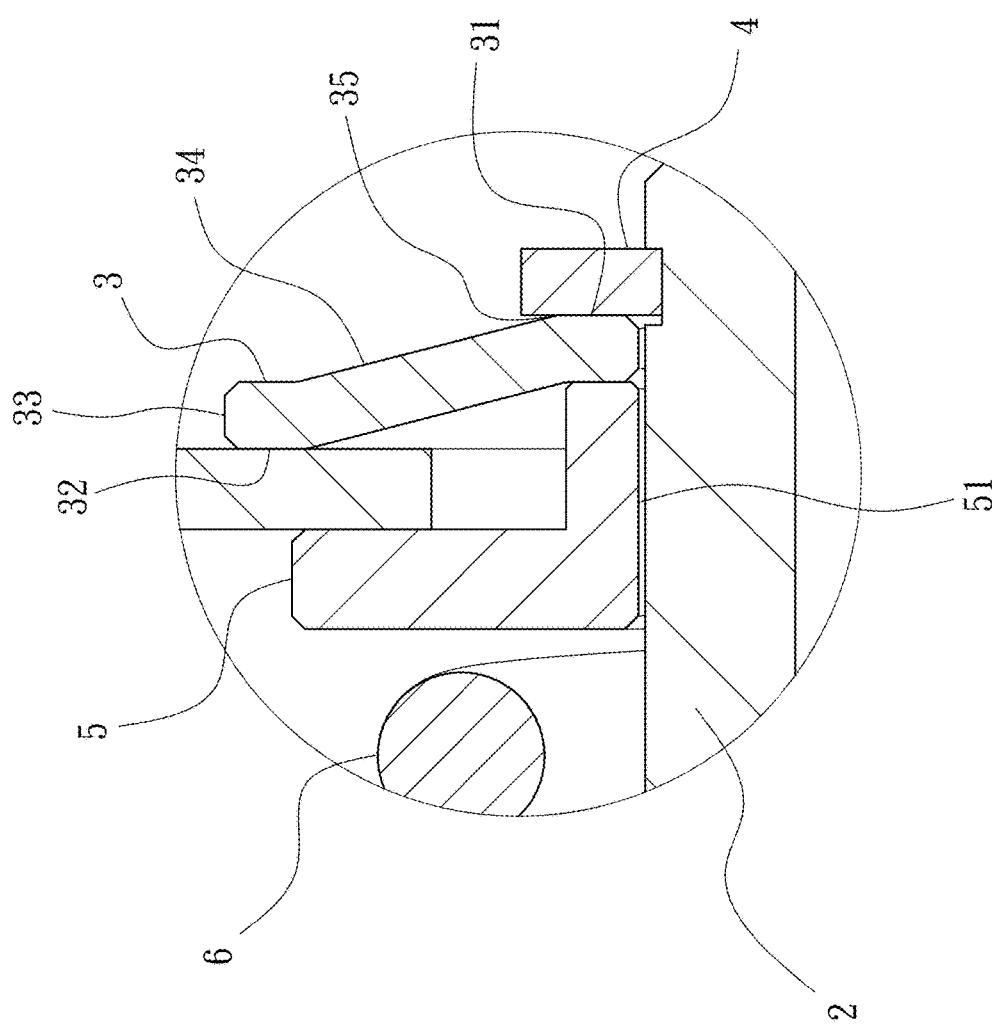
FIG. 3 is an enlarged view of the circled area of FIG. 2.
Figure 4:
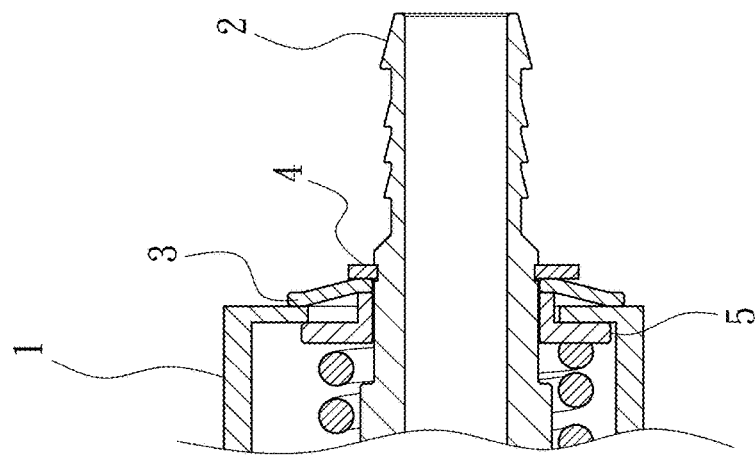
FIGS. 4 and 5 are fragmentary sectional views respectively showing the present invention before and after an adaptor joint thereof is displaced radially relative to a fixed retainer thereof.
Figure 5:
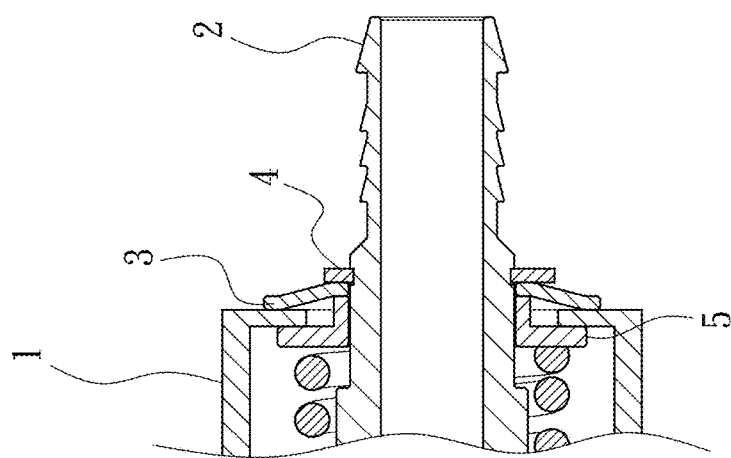

The present invention will now be described with a preferred embodiment thereof. Please refer to the accompanying drawings, wherein FIGS. 1 and 2 are exploded perspective view and assembled sectional view, respectively, of a floating joint and retainer connection device with pressure relief structure according to a preferred embodiment of the present invention; FIG. 3 is an enlarged view of the circled area of FIG. 2; and FIGS. 4 and 5 are fragmentary sectional views respectively showing the present invention before and after an adaptor joint thereof is displaced radially relative to a fixed retainer thereof.

As shown in FIGS. 1 and 2, the preferred embodiment of the present invention includes a fixed retainer 1, an adaptor joint 2, an elastic element 3, a fixing element 4, an abutting spacer 5, and a spring 6.

The fixed retainer 1 has a first side 11 and a second side 12 located opposite to each other, and internally defines a receiving space 13 located between the first and the second side 11, 12. The first side 11 of the fixed retainer 1 is an open side defining a penetrating opening 111 communicating with the receiving space 13; and the second side 12 is a closed side provided with a through hole communicating with the receiving space 13.

The adaptor joint 2 has a fitting section 21 and an engaging section 22 located at two opposite ends of the adaptor joint 2, and further includes a buffering section 23 located between and connected at two ends to the fitting section 21 and the engaging section 22. An axially limiting section 24 is formed at a junction of the engaging section 22 and the buffering section 23. The fitting section 21 is extended through the receiving space 13 of the fixed retainer 1 to project from the second side 12 via the through hole 121 with the buffering section 23 of the adaptor joint 2 located in the receiving space 13 and the through hole 121. The engaging section 22 of the adaptor joint 2 is connectable to a male coupler 7 or other structure or element end to end. Alternatively, the engaging section 22 can have a structure extended therefrom for connecting with another element.

The elastic element 3 is fitted on an outer surface of the fitting section 21 of the adaptor joint 2 and has two axially opposite sides respectively being a front end 31 and a rear end 32. The rear end 32 of the elastic element 3 is pressed against the second side 12 of the fixed retainer 1. More specifically, the elastic element 3 can produce a normal force when the front end 31 and the rear end 32 thereof are axially compressed. The elastic element 3 can be, but not limited to, a flat spring, a washer, or an elastic plate in the present invention.

Please refer to FIG. 3. In one example, the elastic element 3 is a washer, the rear end 32 of which has at least one portion tapered toward the front end 31, and the rear end 32 has an inner diameter larger than an outer diameter of the front end 31. With this configuration, the elastic element 3 is elastically deformable in an axial direction. Specifically, the washer 3 includes an expanded section 33, a tapered section 34, and a flat section 35 sequentially arranged from a radially outer side to a radially inner side. The expanded section 33 constitutes the rear end 32 and is extended radially outward to be annular and flat in shape; the flat section 35 constitutes the front end 31 and is extended radially inward to be annular and flat in shape; and the tapered section 34 is located between a radially inner edge of the expanded section 33 and a radially outer edge of the flat section 35 and is tapered from the expanded section 33 toward the flat section 35. Therefore, the expanded section 33 has an inner diameter larger than an outer diameter of the flat section 35. With the above-designed expanded section 33 and flat section 35, a force applied to the washer 3 can be uniformly transmitted between the expanded section 33 and the flat section 35. Further, the elastic element 3 is made of an elastic material. When the elastic element 3 is axially compressed and the elastic material is elastically deformed, normal forces in two opposite directions can be applied to the front end 31 and the rear end 32.

The fixing element 4 is also fitted on the outer surface of the fitting section 21 of the adaptor joint 2 to press against the front end 31 of the elastic element 3, so that the elastic element 3 is located between the second side 12 of the fixed retainer 1 and the fixing element 4. With this arrangement, the fixing element 4 can limit the adaptor joint 2 from moving axially relative to the fixed retainer 1 but allows the adaptor joint 2 to displace radially relative to the fixed retainer 1. A distance between the fixing element 4 and the second side 12 of the fixed retainer 1 is smaller than a free length between the front end 31 and the rear end 32 of the elastic element 3 when there is not any force applied to the elastic element 3. Therefore, the elastic element 3 disposed between the second side 12 of the fixed retainer 1 and the fixing element 4 is compressed to produce desired normal forces against the front and the rear end 31, 32 of the elastic element 3. For instance, the fixing element 4 can be a retaining ring such as a C-ring, or an annular nut with internal threads for tightening to the fitting section 21. In the case the fixing element 4 is a retaining ring, the buffering section 23 can include an annular groove formed at a location at where the retaining ring is to be fastened in place. In this way, the retaining ring can be fixed to a predetermined position on the fitting section 21 without moving axially undesirably.

The abutting spacer 5 is disposed in the fixed retainer 1 and fitted around the buffering section 23 of the adaptor joint 2. The abutting spacer 5 includes an axially protruded section 51 formed on one side thereof. The protruded section 21 is extended to an outer side of the second side 12 of the fixed retainer 1 via the through hole 121 and is pressed against the elastic element 3. As can be seen from FIG. 3, the protruded section 51 is in the form of an annular tube having a fixed diameter, it is axially extended through the through hole 121 to directly contact with the flat section 35 of the elastic element 3, so that an external force applied to the abutting spacer 5 can be axially transmitted via the flat section 35 to the fixing element 4, and the adaptor joint 2 in turn bears the force from the abutting spacer 5. The protruded section 51 of the abutting spacer 5 can be integrally or non-integrally formed with other portion of the abutting spacer 5. In the preferred embodiment illustrated in FIG. 3, the protruded section 51 is integrally formed with the abutting spacer 5. However, it is understood the present invention is not intended to be limited to the illustrated preferred embodiment in any way.

The spring 6 is fitted on the buffering section 23 with two ends respectively pressed against another side of the abutting spacer 5 opposite to the protruded section 51 and the axially limiting section 24 of the adaptor joint 2. The spring 6 has a free length larger than a length between the other side of the abutting spacer 5 and the axially limiting section 24. When the fitting section 21 of the adaptor joint 2 is extended through the receiving space 13 of the fixed retainer 1 with the buffering section 23 located in the receiving space 13, the spring 6 is elastically compressed and has a preload. In the present invention, as shown in FIG. 2, the spring 6 is pressed at two ends against the axially limiting section 24 of the adaptor joint 2 and the abutting spacer 5, and a normal force from the spring 6 is transmitted from the abutting spacer 5 via the protruded section 51 to the flat section 35 of the elastic element 3, such that the preload of the spring 6 can be transmitted to the fixing element 4. In this way, both ends of the spring 6 apply a force to the adaptor joint 2 to achieve a force balanced state, and the adaptor joint 2 would not encounter a too large resistance due to a too large preload of the spring 6 when the adaptor joint 2 is slid radially relative to the fixed retained 1.

More specifically, as shown in FIG. 3, both the elastic element 3 and the fixing element 4 are fitted on the fitting section 21 of the adaptor joint 2, and both the abutting spacer 5 and the spring 6 are fitted around the buffering section 23 of the adaptor joint 2. When the spring 6 is axially compressed at two opposite ends thereof, both ends of the spring 6 will provide an outward normal force to produce a frictional force between the rear end 32 of the elastic element 3 and the second side 12 of the fixed retainer 1. With this frictional force, the adaptor joint 2 can be slid radially relative to the through hole 121 on the fixed retainer 1, for example to move vertical, and stop and suspend at any desired position in the receiving space 13. For example, in the illustrated preferred embodiment, it is also possible to adjust and control a spacing distance of the protruded section 51 of the abutting spacer 5 relative to the fixing element 4 and use the spacing distance in cooperation with, for example, the length of the tapered section 34 of the elastic element 3 to further adjust the size of the radial sliding resistance according to actual need.

Please refer to FIGS. 4 and 5. The through hole 121 has an inner diameter larger than an outer diameter of the fitting section 21, and a radial gap is existed between the axially protruded section 51 of the abutting spacer 5 and the inner diameter of the through hole 121, allowing the buffering section 23 of the adaptor joint 2 to move radially in the through hole 121 relative to the fixed retainer 1. For example, the adaptor joint 2 can move vertically in the through hole 121 to stay and suspend at any position in the radial gap at a slightly inclined angle to compensate the radial tolerance between it and the fixed retainer 1 and accordingly, overcome the problem of having an external force unevenly applied thereto.

With the above arrangements of the elastic element 3, the abutting spacer 5, and the fixing element 4 between the fixed retainer 1 and the adaptor joint 2 in the floating joint and retainer connection device with pressure relief structure according to the present invention, the normal force applied by the spring 6 is more stable, which not only allows the adaptor joint 2 after the radial displacement to stay and suspend at any desired position in the radial gap between the abutting spacer 5 and the through hole 121 on the fixed retainer 1, but also avoids difficult radial displacement of the adaptor joint 2 relative to the fixed retainer 1 due to a too large preload of the spring 6.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A floating joint and retainer connection device with pressure relief structure, comprising:
   a fixed retainer having a first side and a second side, and internally defining a receiving space located between the first and the second side; and the first side being an open side and the second side being a closed side provided with a through hole communicable with the receiving space;
   an adaptor joint having an engaging section and a fitting section, and including a buffering section located between and connected to the engaging section and the fitting section; the adaptor joint having an axially limiting section formed at a junction of the engaging section and the buffering section; and the fitting section being extended through the receiving space to project from the fixed retainer via the through hole;
   an elastic element being fitted on and around the fitting section of the adaptor joint and having a front end and a rear end, and the rear end of the elastic element being pressed against the second side of the fixed retainer;
   a fixing element being fitted on and around the fitting section of the adaptor joint to press against the front end of the elastic element, so as to limit the adaptor joint from moving axially relative to the fixed retainer;
   an abutting spacer being located in the fixed retainer and fitted around the buffering section of the adaptor joint; and the abutting spacer including an axially protruded section formed on one side thereof for extending through the through hole to abut against the elastic element; and
   a spring being fitted around the buffering section with two ends of the spring pressed against another side of the abutting spacer and the axially limiting section of the adaptor joint.

2. The floating joint and retainer connection device with pressure relief structure as claimed in claim 1, wherein the elastic element is a washer having an expanded section, a tapered section, and a flat section sequentially arranged from the rear end toward the front end of the washer; the expanded section constituting the rear end and being extended radially outward to be annular and flat in shape; the flat section constituting the front end and being extended radially inward to be annular and flat in shape; and the tapered section being located between and connected to a radially inner edge of the expanded section and a radially outer edge of the flat section and being tapered from the expanded section toward the flat section.

3. The floating joint and retainer connection device with pressure relief structure as claimed in claim 1, wherein the fixing element is selected from the group consisting of a retaining ring and a nut.

4. The floating joint and retainer connection device with pressure relief structure as claimed in claim 1, wherein the through hole has an inner diameter larger than an outer diameter of the fitting section.

* * * * *